United States Patent [19]

Wright

[11] 4,029,958

[45] June 14, 1977

[54] APPARATUS FOR INSPECTING CONTAINERS

[75] Inventor: George W. Wright, Willingboro, N.J.

[73] Assignee: Crown Cork & Seal Company, Inc., Philadelphia, Pa.

[22] Filed: July 25, 1975

[21] Appl. No.: 599,070

[52] U.S. Cl. ........................ 250/223 B; 209/111.8; 356/198; 209/111.7 R

[51] Int. Cl.[2] ................ B07C 5/344; G01D 21/004

[58] Field of Search ..................... 209/111.7, 111.8; 250/223 B; 356/196, 198; 250/224

[56] References Cited

UNITED STATES PATENTS

| | | | |
|---|---|---|---|
| 2,742,151 | 4/1956 | Milford | 250/223 B |
| 2,753,459 | 7/1956 | Fedorchak | 250/223 B |
| 3,020,472 | 2/1962 | Cauley | 209/111.8 |
| 3,392,829 | 7/1968 | Keinanen | 209/11.8 X |
| 3,439,178 | 4/1969 | Rottmann | 250/223 B X |
| 3,529,169 | 9/1970 | Heaney et al. | 250/223 B |
| 3,887,284 | 6/1975 | Gender et al. | 250/223 B |

*Primary Examiner*—Alfred E. Smith
*Assistant Examiner*—T. N. Grigsby
*Attorney, Agent, or Firm*—Woodcock Washburn Kurtz & Mackiewicz

[57] ABSTRACT

A stream of cylindrical metal containers is fed into apparatus having a rotatable turret. The turret indexes each container past a driven wheel for imparting rotation thereto, and the rotating containers are scanned by a split flange detector. At the same or another point about the turret, a proximity detector disposed in close conjunction with the periphery of the rotating container detects any substantial runout of the periphery, indicating a dented container. Still another inspection station comprises a source of diffuse light directed against the sidewalls within a container, and a photosensor directed toward the container end for registering the intensity of reflected light. The light intensity is used as an indication of the presence (or absence) of coating material on substantial areas of the container interior. A compressed air nozzle downstream of the inspection stations is operated by an electrically-controlled valve in timed relationship with the various inspection apparatus to selectively discharge faulty containers from the container stream.

12 Claims, 4 Drawing Figures

APPARATUS FOR INSPECTING CONTAINERS

BACKGROUND OF THE INVENTION

The present invention relates to testing apparatus, and more particularly to means for inspecting cylindrical metal containers for structural integrity and for the presence of an internal coating.

The manufacture of metallic containers, and particularly steel or aluminum cans of the one-piece drawn and ironed type, places severe demands upon the manufacturing process. On one hand, it is necessary to be able to manufacture the containers in substantial quantities and therefore at a high rate. On the other hand, it is necessary that each container be structurally sound so that it may be properly filled and sealed, and it is also highly desirable that each container be labelled, coated, and otherwise treated in a prescribed fashion. In particular it is necessary that certain types of containers, depending upon the use to which they are to be put and the substances which they are to contain, have a coating applied thereto so as not to impart an undesirable taste to the contents.

With the advent of drawn and ironed containers the critically of the manufacturing process has become even more demanding. Such containers are initially drawn from sheet metal blanks, then forced through a series of annular dies of progressively decreasing diameter so as to form a one-piece can body having extremely thin walls. Due to the necessity of handling the cans in high volume and thus at relatively high flow rates, the cans are occasionally dented or otherwise damaged. Further, during the formation of the outer flanges thereof the thin sidewall metal occasionally cracks. Although it is apparent that the defects so far described must be detected during the can manufacturing process, satisfactory means for rapidly and economically effecting such inspection do not exist in the prior art.

A further problem with prior manufacturing processes is the facile detection of substantial uncoated areas within a container. Modern coating apparatus ordinarily produce an acceptably uniform coating over the ends and sidewalls of containers. However, occasionally the apparatus, which conventionally takes the form of a plurality of spray nozzles, becomes clogged and inoperative. In such a case the sidewalls, end walls, or both remain uncoated. Since the coating is ordinarily a transparent lacquer-like material the absence of the coating is not immediately apparent and not infrequently a large number of containers will pass uncoated before the failure is detected.

It will therefore be understood that it would be highly desirable to provide improved means for rapidly inspecting certain aspects of the structural integrity of a metallic container, and for rapidly and accurately testing for the presence of a coating upon the inner surfaces of the container.

It is therefore an object of the present invention to provide improved means for checking the structural integrity of a metallic container.

It is another object of the present invention to detect minute splits in the flange area of a metallic container.

Another object of the invention is to detect predetermined eccentricity in the sidewalls of a cylindrical metallic container.

Still another object of the present invention is to automatically detect the absence of coating material on the lateral or end surfaces of a metallic container.

SUMMARY OF THE INVENTION

Briefly stated, in accordance with one aspect of the invention the foregoing objects are achieved by providing a turret for receiving and indexing individual containers about an arcuate path, then discharging the containers into a second path. Means adjacent to the turret impart rapid rotation to each of the containers. Subsequently a first inspection means applies a magnetic field across the flange area of the containers, and detects discontinuities in the field flux which are indicative of split flanges. Proximity detector means, also disposed adjacent the indexed rotating containers, produces a signal indicative of the eccentricity thereof. In order to detect the absence of a coating within the container a juxtaposed photosensor and light source are provided, the sensor being directed toward the distal closed end of the container, and the light source being directed upon a sidewall thereof such that the average intensity of the light within the container, as detected by the photosensor, is indicative of the presence or absence of a coating. Discovery of a faulty container by any of the inspection means operates a valve coupled to a source of compressed air to discharge the defective container from the second path.

In one embodiment of the invention counting means are provided and adapted to receive signals indicative of the flow rate of the containers. The counting means is enabled in response to the detection of a faulty container and operates the discharging apparatus after the container has traversed a predetermined distance.

BRIEF DESCRIPTION OF THE DRAWINGS

While the specification concludes with claims particularly pointing out and distinctly claiming the subject matter which is regarded as the invention, it is believed that the invention will be better understood from the following description of a preferred embodiment taken in conjunction with the accompanying drawings in which:

DESCRIPTION OF A PREFERRED EMBODIMENT

Figure 1:
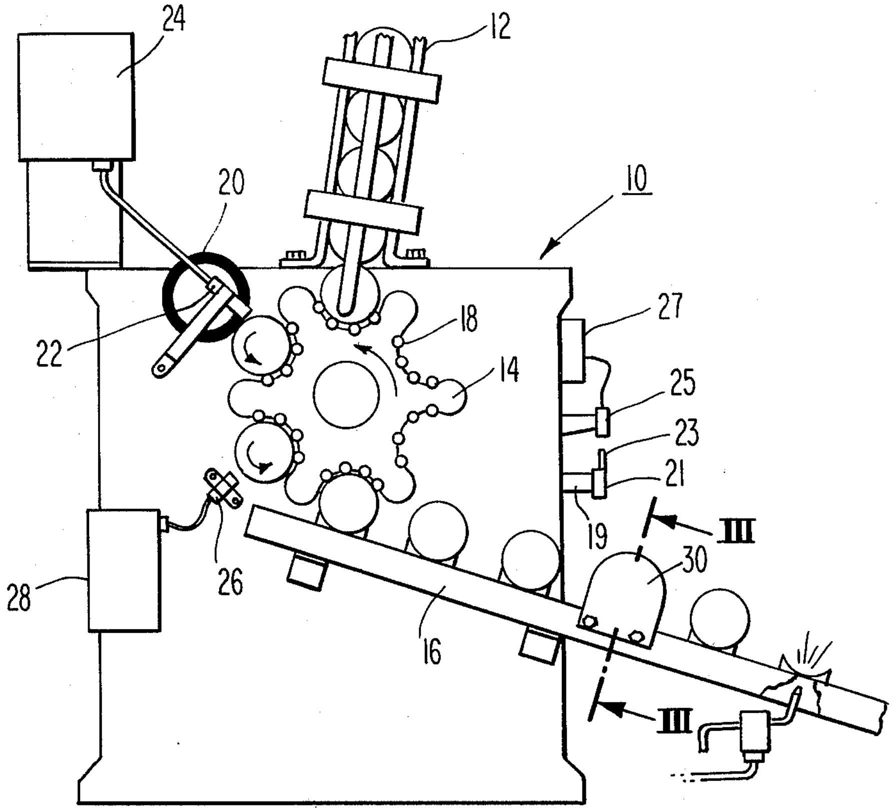
FIG. 1 is an elevational view of apparatus embodying the teachings of the present invention.

FIG. 1 is a side elevation which depicts apparatus constructed in accordance with the teachings of the present invention. The apparatus, generally indicated at 10, includes an infeed portion exemplified by a downwardly-directed chute 12. Containers from an overhead conveyor are introduced into the chute and urged therealong by gravity, or by rotary brushes, conveyors, or other suitable means. At the lower end of chute 12 the lowermost container is allowed to drop into a pocket-like area between radially extending members of a turret 14. The turret, which rotates in the direction indicated, receives each container and indexes it through an arcuate path about the axis of the turret, ultimately discharging each container along an exit path here shown as a conveyor chute 16.

Disposed within each of the pockets defined by adjacent ones of the radially-extending turret arms are a plurality of rollers 18 which serve to rotatably support each container. While the rotatable supports shown in the Figure are rollers it will be apparent to those skilled in the art that other low-friction means may be substituted therefor, the principal object being to allow the easy rotation of each cylindrical container as it is indexed about by the turret.

As each container is transported in a counterclockwise fashion by turret 14, it is brought into frictional contact with a driver 20. Driver 20 advantageously comprises a rigid disk driven by appropriate means, and is provided with a peripheral member of rubber or a similar substance for frictionally engaging each container. The drive means rotates as shown to impart a counterclockwise rotation to each of the containers, which rotation is facilitated by the presence of rollers 18. In one successfully tested embodiment, rotational speeds of between 1000 and 2000 rpm were found suitable for the containers. Other approaches to rotating the individual containers might be taken, such as coupling each container to a rotatable chuck and then bringing the chuck into frictional contact with driver 20 or with a moving belt. It should therefore be understood that the manner of rotating the containers itself forms no part of the present invention.

The present apparatus also advantageously includes a shaft 19 which rotates at a predetermined speed with respect to the turret. A rod-like element 23 is associated with the shaft by means of a collar 21. A proximity detector system comprising a transducer 25 and level detector 27 are provided, the transducer being placed in close proximity to the path of rod 23 and the level detector coupled to appropriate counting circuitry, to be disclosed hereinafter. The level detector and transducer serve to produce electrical signals in response to the motion of pin 23 and so the rotation of shaft 19. In this manner a train of pulses is produced which bear an invariant, predetermined relationship to the speed of rotation of turret 14 and therefore to the rate at which containers are passed through the apparatus.

A magnetic field-sensing transducer 22 is mounted at some convenient point about the arcuate path of rotating containers. The specific location of this inspection station is not critical and may reside at any convenient point along the path of the containers, it only being necessary that the containers be rotating as they pass the transducer. In the illustrated embodiment transducer 22 is conveniently located at approximately the same position as driver 20. Transducer 22 includes an inductive element such as a coil into which electrical currents are induced by a magnetic field. An appropriate source of magnetic flux is disposed at the opposite side of the coil from the rotating container.

Figure 2:
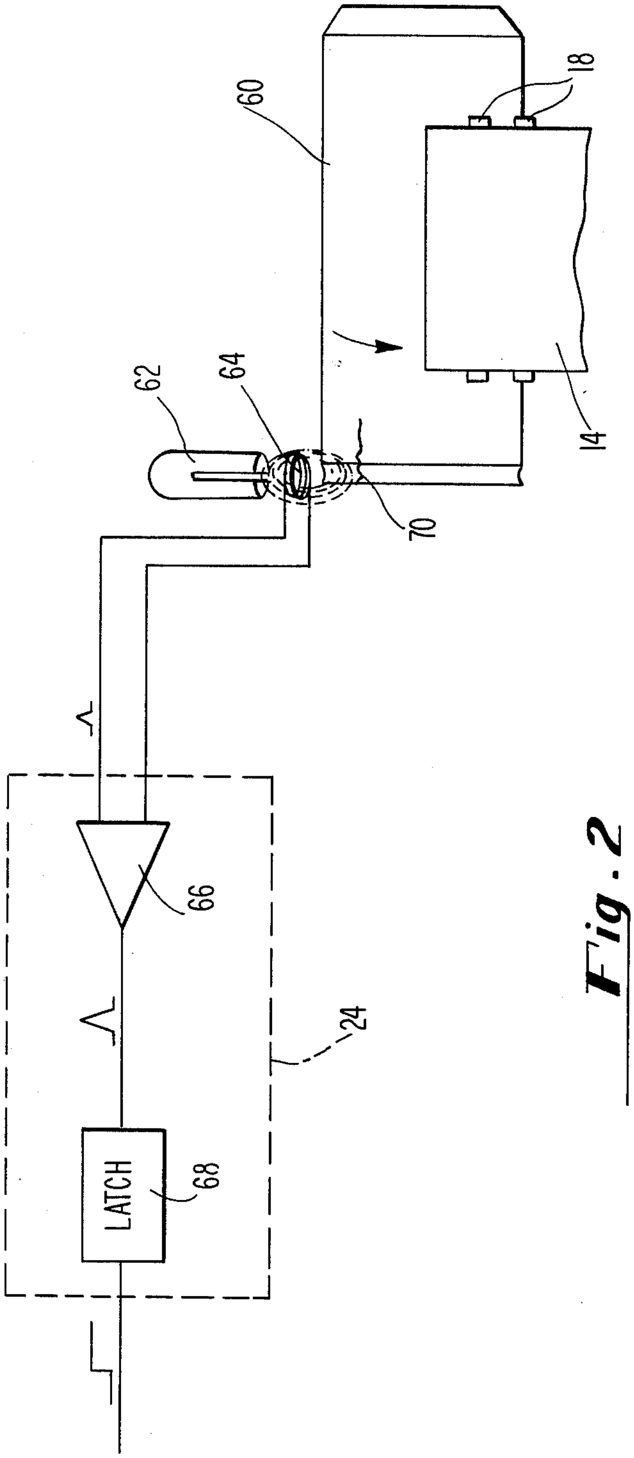
FIG. 2 illustrates the construction of a portion of an inspection system.

Turning now to FIG. 2 there is shown a split flange detector of the type used in practicing the present invention. The detector is illustrated in schematic form in order to more readily depict its operation.

A container 60 to be inspected is rapidly rotated in turret 14, and supported by means of rollers 18. Spaced from the flange of the container and generally aligned therewith is a source of magnetic flux, herein shown as permanent magnet 62. If desired, an electromagnet could be substituted for the permanent magnet shown.

The opposing poles of magnet 62 are disposed in side-by-side relationship as shown so that the lines of flux given rise to by the magnet intercept the container in the region about the flange thereof. As the container spins a wall of permeable metal continuously traverses the field, providing a substantially uniform path for the magnetic flux. Transducer 22 is disposed intermediate the magnet and the container. In a successfully-tested embodiment the transducer comprised a coil whose turns are so disposed as to be intercepted by the field of magnet 62. An appropriate detector 24 is coupled to coil 64 for outputting a signal in response to an untoward variation in the magnetic field. Such a detector may readily be constructed from familiar devices such as an amplifier 66 and a latch circuit 68. The construction of the detector 24 is shown by way of example only, it being recognized that alternative signal processing arrangements will occur to those skilled in the art and it is not intended that the specific circuitry of the detector comprise a part of the present invention. In one successfully operated system a transducer system and detector manufactured and sold by Hentschel Instruments, Inc. of Ann Arbor, Mich. was used.

A crack or split 70 in the container flange will constitute both an electrical discontinuity in the body of the container and a magnetic discontinuity in the field of magnet 62. Thus, when split 70 passes through the magnetic field a signal is produced by coil 64 which is amplified by amplifier 66 and applied to latch circuit 68. Dut to the transient nature of the transducer signal it is necessary that the detector respond thereto with a signal of relatively longer duration to activate subsequent circuitry discussed hereinafter, for ejecting the faulty container. The signals arising from a discontinuity in the rapidly-rotating container occur at a predetermined rate. For instance, for a single fracture in the flange of a container rotating at 2000 rpm, a magnetic field discontinuity will be sensed at a frequency of 33⅓ cycles per second. Multiple fractures will produce field discontinuities which occur at integral multiples of this frequency. Therefore, it will be seen that a frequency-sensitive detector mechanism could alternatively be used with the disclosed transducer. In either case the signal outputted by the detector is applied to further circuity, discussed hereinafter, which effects the removal of a faulty container from the stream of containers under test.

Also disposed adjacent the arcuate path of the rotating containers is a proximity detector comprising a transducer 26 and appropriate level detection circuitry generally indicated at 28. While proximity detectors are available which operate on various principles, e.g. capacitance sensing, eddy current detection, etc. the present invention is not necessarily limited to any particular type of sensor. However, in a successfully tested embodiment a sensor of the eddy current type was utilized. Regardless of its type, the function of the proximity detector as used herein is to sense a departure by the cylindrical sidewall of the rotating container from its nominal, circular locus. Eccentricity of the sidewall produces a commensurate change in the output of transducer 26. The change in output is then sensed by the level detection system 28, which is adjusted to respond to signal changes representing eccentricity in excess of some signal changes representing eccentricity in excess of some predetermined maximum valve. In the embodiment tested, a proximity detector produced by the Dennison Co. and using a pair of aligned transducers each ¾ of an inch in diameter was found satisfactory. Due to the relatively small size of the transducers it was found desirable to use a pair thereof, aligning them axially along the sidewall of the juxtaposed container. In this manner any eccentricities, and particularly dents, in the container wall are readily perceived. In response to the detection of unacceptable sidewall eccentricity, level detector 28 outputs an error signal which is used to operate a discharge mechanism located downstream in the container flow path.

A third inspection station provided by the present invention comprises an internal coating inspection mechanism 30. While the coating inspection mechanism is shown as disposed along the linear, discharge path of the apparatus it will become apparent to those skilled in the art that it might alternatively be disposed at other appropriate locations along the path of the containers.

Figure 3:
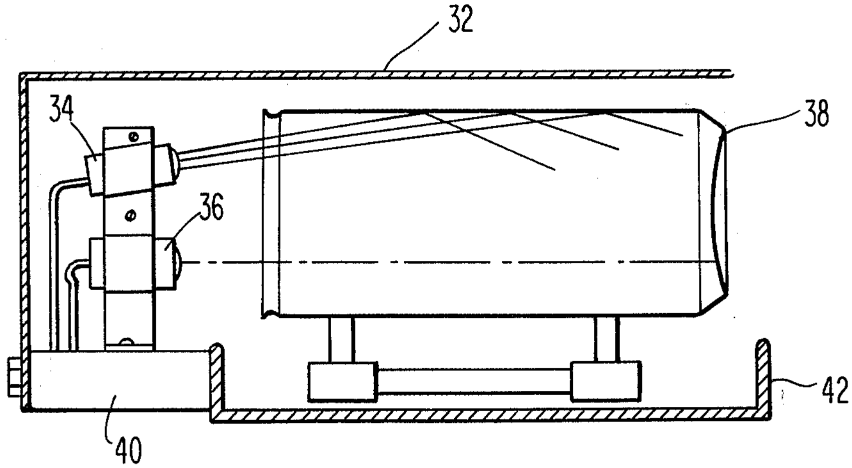
FIG. 3 is a cross-sectional diagram taken at 3—3 of FIG. 1.

FIG. 3 shows a cross-sectional diagram of the coating inspection apparatus. A shield 32 is advantageously fixed about the station to protect the sensing devices utilized, and also to aid in preventing ambient light from affecting operation of the mechanism. A light source 34 is provided and serves as a source of substantially diffuse light. Source 34 is oriented so as to direct the diffuse light into the container under inspection. It has been found that by orienting the light path at approximately 20° with the container sidewall the operation of the system is enhanced, the light being more evenly distributed within the container.

A photosensor 36 is located adjacent light source 34, and disposed so as to be directed substantially axially into the container so that it is in effect pointed toward the end wall of the container.

Although in some applications it may be desirable to utilize infrared light along with an appropriate sensor so as to minimize the effect of ambient light, in one successfully tested embodiment light source 34 produced visible white light. This provides the double advantage of accommodating in inexpensive, easily procured light source, such as an incandescent bulb, and makes possible the use of an inexpensive type of photosensor such as the common cadmium sulfide cell. In operation, it is assumed that container 38 has previously passed through a coating station at which an internal coating, commonly a clear lacquer, has been applied to the end and sidewalls thereof. Such a coating is conventionally applied with a pair of spray heads, one for the axial end wall, and the other for the sidewalls. The operation of the most coating mechanisms is such as to provide even coverage of the wall surfaces. However, occasionally one or both heads of state-of-the-art mechanisms become inoperative due to clogging or other difficulties. Thus it will be appreciated that the most common failure mode is not the uneven or partial coating of a wall, but the total absence of coating.

Accordingly, the present invention includes means for sensing the reflectivity of the total inner surface of a passing container. The inner surfaces of the container when coated exhibit substantially less reflectivity than do uncoated surfaces. Accordingly, by flooding the inside of the container with substantially diffuse light and using the photosensor to monitor the intensity of the light therewithin, it has been found that detection of substantial uncoated inner surfaces can be achieved. In particular, it has been found that by directing a source of diffuse light against the side wall of a container light reflected from an end wall thereof will provide a reliable measure of the overall reflectivity of the container inner surfaces. In the present embodiment, photosensor 36 is directed toward the axial end wall of the container for this purpose.

The neighboring light source 34 and sensor 36 are conveniently mounted upon an appropriate bracket assembly 40 adjacent a conveyor apparatus 42 which defines a path traversed by containers under inspection. It should be noted that with the present arrangement it is unnecessary for the containers to be rotated to achieve the desired light integrating or averaging effect.

Photosensor 36 is coupled to a level detector of a type well known to those skilled in the art which outputs an error signal upon the detection by the photosensor of light of an intensity above some predetermined value. As this value is generally substantially greater than the ambient light level experienced about the conveying and inspection apparatus, it has been found unnecessary to activate the light source and/or photosensor only when a container to be inspected is in position. Rather, the light source and photosensor may remain energized as containers pass the inspection station, the level detection circuitry only becoming operative when a container having an unduly reflective surface is present at the inspection station. The error signal outputted by the level detector is then utilized in the manner described above to operate an appropriate valve for causing a blast of compressed air to discharge a defective container from the conveyer.

Figure 4:
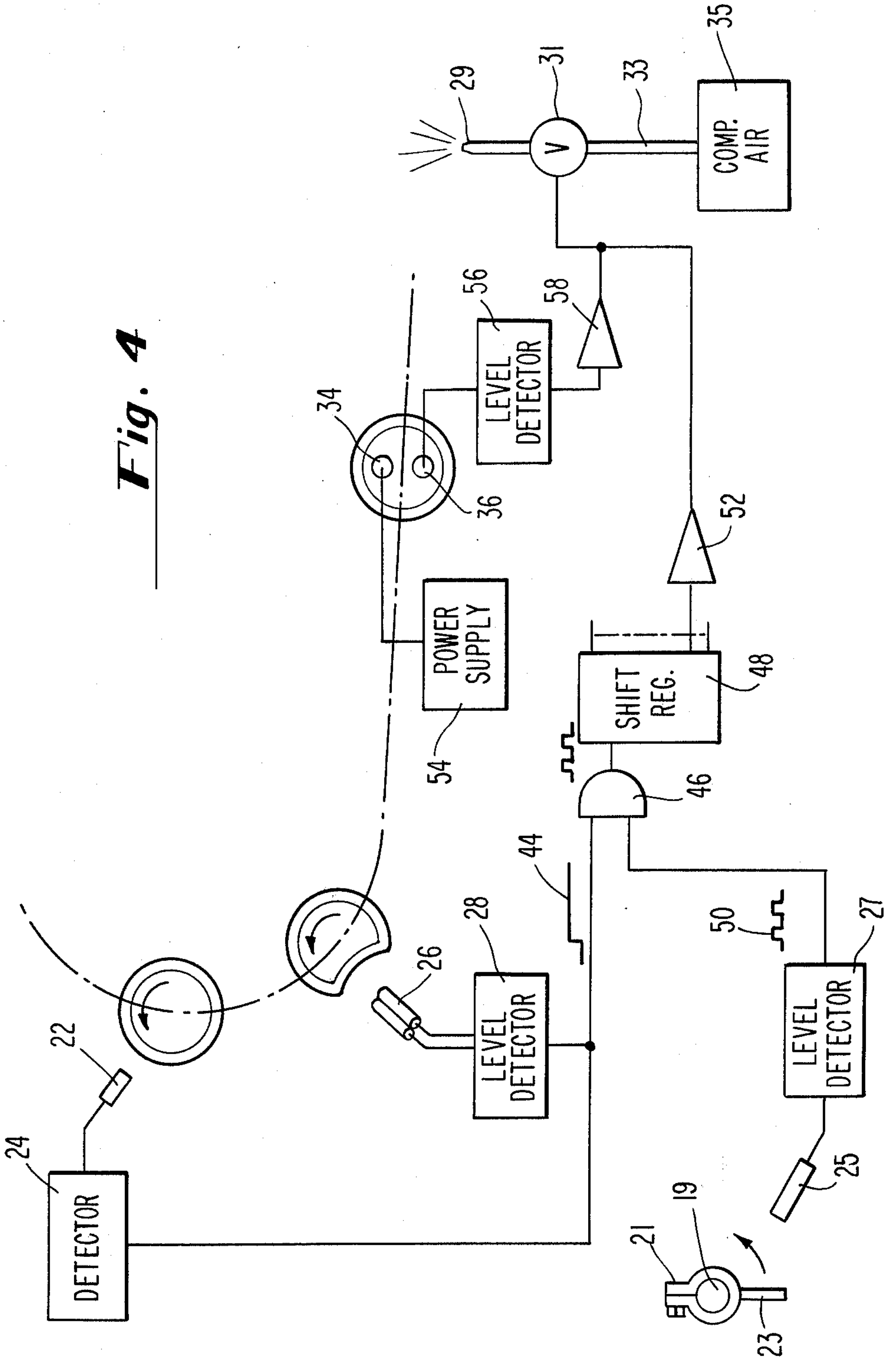
FIG. 4 is a schematic diagram illustrating certain aspects of the present invention.

FIG. 4 shows in schematic form the interconnection of the above-described apparatus. Transducer 22 is shown in close proximity to a rotating container, its output being coupled to detector 24 which serves to discern the presence of cracks or splits in the flange of the container under inspection by responding to transducer signals indicative of discontinuities in the container material. The detector then outputs an error signal, generally represented at 44. Error signal 44 is applied to an enabling means, such as AND gate 46, to allow a shift register 48 to become operative.

As was described with respect to FIG. 1, the container transporting means advantageously includes a rotating shaft 19 which rotates at some fixed relationship to the rate at which containers are transported through the machine. For the purposes of the present description, it will be assumed that shaft 19 rotates twice for each successive container received by turret 14. Coupled about shaft 19 is a collar 21 to which is affixed a rod 23. A proximity detector 25 is disposed adjacent the path of rod 23 and outputs a signal each time rod 23 passes. A level detector 27 responds to the signals and outputs a train of pulses 50 in synchronism with the passage of individual containers through the system. Pulses 50 are applied to the lower input of AND gate 46. However, as will be familiar to those skilled in the art, an AND gate is only operable in the presence of signals at all of the inputs thereof. AND gate 46 therefore will produce no output signals in response to the rotation of shaft 19, unless enabling error signal 44 is also present.

When a defective container is sensed and an error signal 44 produced, pulses 50 are then reflected in the output of AND gate 46 and transmitted thereby to the input of a shift register 48. The shift register acts in the manner of a counter to sequentially energize output terminals thereof in accordance with the number of received signals. In the present embodiment, a commonly available 64 -position shift register is utilized, output circuitry being coupled to the 14 th position thereof.

Referring back to FIG. 1, it will be seen that the discharge apparatus is stationed at the seventh container position subsequent to the inspection station at which magnetic probe 22 is present. As shaft 19 rotates twice for the passage of each container 14 rotations of the shaft, evinced by 14 pulses from level detector 27, signify the transportation of a container from the split flange inspection station to the discharge station. Thus, when the 14 th shift register position of shift register 48 is energized, actuation of the discharge apparatus will occur to remove the faulty container.

To effect this operation an appropriate amplifier 52 is used to amplify the minuscule power outputted by shift register 48, and apply it to valve 31. As set forth above, valve 31 is advantageously of the commonly-used electrical solenoid type, and is interposed in a conduit 33 which couples a nozzle 29 to a source of compressed air 35. Energization of valve 31 causes a blast of compressed air to be applied to the faulty container, discharging it from the product stream.

In the same manner, when a dented container is detected by proximity detectors 26 an appropriate error signal is outputted by level detector 28 in response to a substantial change in the output of the proximity detector transducers. As it will be recognized that the output of the proximity detectors changes markedly as containers are brought to and conveyed away from the area thereof, it has been found necessary to gate the proximity sensor circuitry to enable it only when the container is in appropriate location. This may easily be accomplished through the use of appropriate switches operated by or otherwise synchronized with the rotation of turret 14, such mechanism not being considered to be a portion of the present invention.

For simplicity in description, it has been assumed that the proximity transducers 26 are disposed at the same location as is the split flange transducer 22 so that the same delay is effected in operating the discharge mechanism. In this manner a common enabling element 46 and counting means 48 may be utilized by both the split flange and the dented container inspection apparatus. If the proximity detector apparatus is located at a position other than that of the split flange detector a different delay will be required. This can be effected by connecting the shift register 48 to produce an output signal in response to a different number of pulses, or alternatively by providing a second shift register which is associated only with the dented can detection apparatus.

The coating inspection means advantageously makes use of a common discharge apparatus with the other inspection stations. A power supply 54 provides electricity to light source 34 to produce the light necessary for illuminating the interior of passing containers. A level detector 56 is coupled to photosensor 36 and responds to signals outputted by the photosensor which exceed some predetermined value and represent an abnormal degree of light intensity within a container. In this event, level detector 56 outputs an error signal to amplifier 58 to energize solenoid valve 31 and effect the discharge of the faulty container.

While in the embodiment of FIG. 4 it is presumed that the coating inspection station is located sufficiently close to the discharge station so that a separate counting means need not be interposed between level detector 56 and valve 31, it will be recongnized by those skilled in the art that in appropriate circumstances a counter may be necessary depending upon the distance between the coating inspection and discharge stations. For relativey short delays it may alternatively be found desirable to modify the circuitry of level detector 56 so as to effect the requisite time delay before an error signal is applied for energizing valve 31. Therefore, as will be evident from the foregoing description, certain aspects of the invention are not limited to the particular details of the examples illustrated, and it is contemplated that other modifications or applications may occur to those skilled in the art. It is accordingly intended that the appended claims shall cover all such modifications and applications as do not depart from the true spirit and scope of the invention.

What is claimed as new and desired to be secured by Letters Patent of the United States is:

1. Inspection apparatus for detecting the substantial absence of a coating within a cylindrical metal container having one closed axial end, comprising:

means for transporting containers to be inspected along a path;

a source of substantially diffuse light disposed adjacent said path for directing diffused light toward a locus upon the cylindrical sidewall of a container to be inspected;

photosensor means disposed adjacent said path and adjacent said light source, said photosensor being directed axially within and toward the closed end of said container and outputting a signal indicative of a substantial absence of coating upon the total inner surface area of said container; and discharge means coupled to said photosensor means and responsive to said signal for discharging said container from said path.

2. Apparatus as defined in claim 1 wherein light from said source is incident upon a container sidewall at an angle of approximately 20°.

3. Apparatus for inspecting metallic containers of a type including a cylindrical sidewall and an axial end wall, comprising:

a rotatable turret having a plurality of pockets therein for receiving individual ones of the containers and transporting said containers about an arcuate path, and sequentially discharging the containers;

means in said pockets for rotatably supporting ones of said containers while the containers rotate upon their own axes;

infeed means for supplying containers to said pockets of said turret;

outfeed means for receiving containers discharged by said turret and transporting said containers along a second path;

drive means associated with said turret for contacting ones of said containers after reception into corresponding ones of said pockets to impart rotation to said containers about the axes thereof;

magnetic inspection means including a DC magnet disposed adjacent said arcuate path for applying a substantially constant magnetic field to selected locations along the sidewall of ones of said containers, and pickup coil means disposed in said magnetic field between said magnet and a container for sensing perturbations in said field caused by a fracture in said sidewall; and a detector coupled to said pickup coil means for outputting an error signal when a sidewall fracture is sensed.

4. The apparatus defined in claim 3, further including means disposed along said second path and responsive to said error signal for removing faulty containers from said second path.

5. Apparatus for inspecting metallic containers of the type having a cylindrical sidewall and an axial end wall, comprising:

a rotatable turret defining a plurality of pockets about the periphery thereof for selectively receiving individual containers, transporting said containers along an arcuate path about the axis of rotation of said turret, and sequently discharging said containers;

roller means disposed in each of said pockets for rotatably supporting therein ones of said container to allow each of the containers to be rotated about its own axis;

infeed means for supplying containers to said turret;

outfeed means for receiving containers discharged by said turret and transporting said containers along a second path;

rotatable drive means adjacent said arcuate path for engaging and imparting rotation to ones of said containers;

first inspection means disposed adjacent said arcuate path for applying a magnetic field to selected locations in the sidewall of ones of said containers, detecting discontinuities in the field indicative of a fracture in said sidewall, and outputting a first error signal in response thereto;

second inspection means disposed adjacent said arcuate path responsive to the proximity of the sidewall of ones of said containers and for outputting a second error signal when the location of said sidewall during rotation of said container deviates from a circular locus by a predetermined amount;

discharge means disposed adjacent said second path for controllably ejecting selected ones of said containers from said second path; and means coupling said discharge means to said first and second inspection means to effect the ejection of faulty containers identified by said first or said second inspection means.

6. Apparatus for inspecting metallic containers having a cylindrical sidewall and an end wall, comprising:

a rotatable turret for sequentially receiving individual containers, transporting said containers along an arcuate path, and sequentially discharging said containers;

means in said turret for rotatably supporting ones of said containers;

infeed means for supplying containers to said turret;

outfeed means for receiving containers discharged by said turret and transporting said containers along a second path;

means adjacent said turret for imparting rotation to ones of said containers;

first inspection means disposed adjacent said arcuate path for applying a magnetic field to selected locations in the sidewall of ones of said containers, detecting discontinuities in the field indicative of a fracture in said sidewall, and outputting a first error signal in response thereto;

second inspection means disposed adjacent said arcuate path responsive to the proximity of the sidewall of ones of said containers and for outputting a second error signal when the position of said sidewall deviates from a circular locus by a predetermined amount;

discharge means disposed adjacent said second path for controllably ejecting selected ones of said containers from said path;

means coupling said discharge means to said first and second inspection means to effect the ejection of faulty containers identified by said first or said second inspection means;

transducer means for producing a signal representative of the rotation of said turret; and representative of the rotation of said turret; and counting means coupled to said transducer means and to at least one of said inspection means, said counting means serving to accumulate first signals from said transducer in the presence of an enabling signal from said inspection means, said counting means outputting a discharge signal to said discharge means after a predetermined number of first signals have been accumulated for energizing said discharge means;

whereby a sensed defective container is discharged from said second path after having traversed a predetermined distance.

7. Apparatus as defined in claim 6 wherein said discharge means comprises an air nozzle, a conduit for coupling said nozzle to a source of compressed air, and an electrically actuated valve responsive to said discharge signal disposed in said conduit.

8. Apparatus as defined in claim 6 wherein said counting means comprises a shift register and an AND gate, said AND gate having inputs coupled to said inspection means and said transducer and an output coupled to said shift register.

9. Apparatus for inspecting metallic containers having a cylindrical sidewall and an end wall, comprising:

a rotatable turret for sequentially receiving individual containers, transporting said containers along an arcuate path, and sequentially discharging said containers;

means in said turret for rotatably supporting ones of said containers;

infeed means for supplying containers to said turret;

outfeed means for receiving containers from said turret;

means adjacent said turret for imparting rotation to ones of said containers;

first inspection means disposed adjacent said arcuate path for applying a magnetic field to selected locations in the sidewall of ones of said containers, detecting discontinuities in the field indicative of a fracture in said sidewall, and outputting a first error signal in response thereto;

second inspection means disposed adjacent siad arcuate path responsive to the proximity of the sidewall of ones of said containers and for outputting a second error signal when the position of said sidewall deviates from a circular locus by a predetermined amount;

discharge means disposed adjacent said second path for controllably ejecting selected ones of said containers from said second path;

means coupling said discharge means to said first and second inspection means to effect the ejection of faulty containers identified by said first or said second inspection means;

third inspection means disposed adjacent one of said paths and comprising a source of substantially diffuse light oriented to direct said light into ones of the containers; and photosensor means for detecting the intensity of reflected light within said containers, and outputting a signal indicative of the presence of a container with substantial uncoated inner surface area.

10. Apparatus as defined in claim 9 wherein said light source and photosensor are disposed adjacent one another, said light source being directed toward a point upon the inner surface of a sidewall of a container, and said photosensor is directed toward the closed end of said container.

11. Apparatus as defined in claim 10, further including means coupling said discharge means to said third inspection means to effect the ejection of faulty containers identified by said first, second or third inspection means.

12. Apparatus as defined in claim 11 wherein said discharge means comprises a nozzle directed toward a predetermined location on said second path, a conduit for coupling said nozzle to a source of compressed air, electrically operated valve means in said conduit, and means coupling said valve means to said first, second and third inspection means.

* * * * *